(12) United States Patent
Wesolowska (10) Patent No.: US 7,574,836 B2
(45) Date of Patent: Aug. 18, 2009

(54) SKIRTING BOARD WITH FINISHING ELEMENTS

(76) Inventor: Malgorzata Wesolowska, ul. Kosciuszki 17, 25-316 Kielce (PL)

( * ) Notice: Subject to any disclaimer, the term of this patent is extended or adjusted under 35 U.S.C. 154(b) by 731 days.

(21) Appl. No.: 10/468,639

(22) PCT Filed: Feb. 19, 2002

(86) PCT No.: PCT/PL02/00012

§ 371 (c)(1),
(2), (4) Date: Apr. 26, 2004

(87) PCT Pub. No.: WO02/066764

PCT Pub. Date: Aug. 29, 2002

(65) Prior Publication Data

US 2004/0168384 A1 Sep. 2, 2004

(30) Foreign Application Priority Data

Feb. 20, 2001 (PL) .................................. 346028
Sep. 13, 2001 (PL) .................................. 349653
Feb. 15, 2002 (PL) .................................. 351992

(51) Int. Cl.
*E04B 2/00* (2006.01)
*E04F 19/04* (2006.01)
*H01R 4/60* (2006.01)
(52) U.S. Cl. ................... 52/288.1; 52/220.1; 52/290; 439/216
(58) Field of Classification Search ............ 52/287.2, 52/288.1, 717.03, 717.05, 718.02, 718.04, 52/718.05, 287.1, 290, 220.1, 220.7, 844; 174/48, 49, 68.3, 101; 439/209, 216, 120
See application file for complete search history.

(56) References Cited

U.S. PATENT DOCUMENTS

| 628,696 | A | * | 7/1899 | Forest et al. | ................ 174/101 |
| 1,229,765 | A | * | 6/1917 | Lehman | ................... 52/288.1 |
| 1,488,090 | A | * | 3/1924 | Buhr | ........................ 52/288.1 |
| 2,297,887 | A | * | 10/1942 | Hall et al. | ................ 52/718.04 |
| 2,970,678 | A | * | 2/1961 | Brinen | ........................ 454/287 |

(Continued)

FOREIGN PATENT DOCUMENTS

| BE | 1621484 | 1/1976 |
| CH | 296285 | 2/1954 |
| CH | 296285 A | 2/1954 |
| DE | 2715211 | 10/1978 |
| DE | 29506436 | 6/1995 |

(Continued)

*Primary Examiner*—Robert J Canfield
*Assistant Examiner*—Charissa Ahmad
(74) *Attorney, Agent, or Firm*—Horst M. Kasper (57) ABSTRACT

The molding (1) has a key slot (2) with longitudinal corrugations, which key slot (2) is inclined at an acute angle to the wall surface. The connecting bracket (4) is a plate and one end of the plate has a shoulder terminated with a flexible tenon (6) with a free end pointed towards the molding, and the other end of the connecting bracket (4) is terminated with a spacer flange (7). Surfaces of the elastic tenon (6) of the connecting bracket have hooks with a triangular profile and the connecting bracket (4) has at least one shelf ledge (9) which supports cables. The molding has a form of a covering, preferably from poly vinyl chloride, which forms a skeleton profile divided with ribs (21) into chambers (28, 29, 30, 31) and the molding has a longitudinal protrusion (19), basically parallel to the wall surface, forming with the chamfered end of the molding an inverted V shape and the protrusion cooperates with the beaded edge (20) of the spacing flange of the connecting bracket (4).

28 Claims, 12 Drawing Sheets

U.S. PATENT DOCUMENTS

| | | | |
|---|---|---|---|
| 3,074,521 A * | 1/1963 | Woods | 52/288.1 |
| 3,262,083 A * | 7/1966 | Gooding | 439/216 |
| 3,286,422 A * | 11/1966 | Pangerl | 52/288.1 |
| 3,302,350 A * | 2/1967 | Brown et al. | 52/288.1 |
| 3,321,878 A * | 5/1967 | Brown et al. | 52/211 |
| 3,449,873 A * | 6/1969 | Zittler et al. | 52/127.12 |
| 3,464,177 A * | 9/1969 | Amato | 52/288.1 |
| 3,546,360 A * | 12/1970 | Bailey | 174/504 |
| 3,721,762 A * | 3/1973 | Gooding | 174/504 |
| 3,821,688 A * | 6/1974 | Larsile | 439/209 |
| 3,911,637 A * | 10/1975 | Schmidiger | 52/288.1 |
| 4,037,900 A * | 7/1977 | Schmidger | 439/216 |
| 4,165,577 A * | 8/1979 | Shanahan et al. | 43/112 |
| 4,204,376 A * | 5/1980 | Calvert | 52/309.1 |
| 4,565,041 A * | 1/1986 | Wendt | 52/288.1 |
| 4,569,171 A * | 2/1986 | Kuhr et al. | 52/242 |
| 4,589,449 A * | 5/1986 | Bramwell | 138/162 |
| 4,986,332 A * | 1/1991 | Lanuza | 160/327 |
| 5,024,614 A * | 6/1991 | Dola et al. | 439/114 |
| 5,033,244 A * | 7/1991 | Ullman | 52/288.1 |
| 5,214,890 A * | 6/1993 | Levitan et al. | 52/220.7 |
| 5,243,800 A * | 9/1993 | Olbrich | 52/287.1 |
| 5,274,972 A * | 1/1994 | Hansen | 52/220.5 |
| 5,336,849 A * | 8/1994 | Whitney | 174/72 C |
| 5,357,053 A * | 10/1994 | Manaras | 174/504 |
| 5,444,954 A * | 8/1995 | Anderson | 52/288.1 |
| 5,459,810 A * | 10/1995 | Villa | 392/352 |
| 5,555,681 A * | 9/1996 | Cawthon | 52/63 |
| 5,598,681 A * | 2/1997 | DiGianni | 52/717.05 |
| 5,694,726 A * | 12/1997 | Wu | 52/287.1 |
| 5,986,212 A * | 11/1999 | Lhota | 174/68.3 |
| 6,088,967 A * | 7/2000 | Johnson | 52/28 |
| 6,122,872 A * | 9/2000 | Sauter | 52/288.1 |
| 6,191,363 B1 * | 2/2001 | Samuels | 174/68.3 |
| 6,216,406 B1 * | 4/2001 | Hauser | 52/287.1 |
| 6,323,421 B1 * | 11/2001 | Pawson et al. | 174/503 |
| 6,324,799 B1 * | 12/2001 | Salvitti | 52/287.1 |
| 6,332,294 B1 * | 12/2001 | Carranza | 52/204.1 |
| 6,360,500 B1 * | 3/2002 | Wilcox | 52/217 |
| 6,381,915 B1 * | 5/2002 | Wood | 52/718.06 |
| 6,469,250 B1 * | 10/2002 | Decore et al. | 174/95 |
| 6,501,026 B1 * | 12/2002 | Piole et al. | 174/99 R |
| 6,513,289 B1 * | 2/2003 | Decore et al. | 52/288.1 |
| 6,557,311 B1 * | 5/2003 | Mongelli | 52/288.1 |
| 6,566,603 B2 * | 5/2003 | Doshita et al. | 174/72 A |
| 6,599,056 B1 * | 7/2003 | Piole et al. | 403/382 |
| 6,727,427 B1 * | 4/2004 | Gutman | 174/492 |
| 6,729,087 B2 * | 5/2004 | Sauter | 52/290 |
| 6,745,525 B2 * | 6/2004 | High | 52/220.7 |
| 6,786,016 B1 * | 9/2004 | Wood | 52/290 |
| 2008/0236072 A1 * | 10/2008 | Johnston | 52/290 |

FOREIGN PATENT DOCUMENTS

| | | | |
|---|---|---|---|
| DE | 29607000 | | 7/1996 |
| DE | 19723558 | | 12/1998 |
| EP | 384486 A2 | * | 8/1990 |
| EP | 0560748 | | 9/1993 |
| EP | 0916783 | | 5/1999 |
| EP | 0952276 | | 10/1999 |
| GB | 1421484 | | 1/1976 |
| GB | 2128223 A | * | 4/1984 |
| GB | 2228147 A | * | 8/1990 |
| WO | WO 9201847 A2 | * | 2/1992 |

\* cited by examiner

SKIRTING BOARD WITH FINISHING ELEMENTS

The subject of the invention is a skirting board which covers the expansion gap between the floor and the wall of a room.

The Patent Application No. EP 97119929 describes a skirting board which is fastened to the wall with a connecting strip by means of a slot-and-tenon joint, wherein the tenon is wedge-shaped.

The Patent Application No. P 332591 describes a connecting bracket for fastening moldings, which connecting bracket has fastening shoulders with clamping lips, which fastening shoulders with clamping lips are pushed into slots of the molding. In the aforementioned solutions, the connecting strip extends over the entire length of the molding.

There is also known a connecting bracket of the skirting board so formed from thin sheet metal that after the connecting bracket is fastened to the wall by means of a plastic screw anchor, the connecting bracket forms a closed rectangular profile terminated with a flexible tenon with an inverted V shape. A molding with a slot is seated on the flexible tenon, wherein the free end of the tenon points towards the wall. A drawback of that solution lies in a difficulty to fasten all the connecting brackets at the same height above the floor. In addition, after the molding has been taken off the connecting brackets several times, it cannot be fastened securely because sharp hooks on the tenon have made grooves on surfaces of the slot.

The skirting board, comprising a molding with a slot and a connecting bracket, wherein the connecting bracket ends with the elastic tenon, wherein the slot of the molding is inclined at an acute angle to the wall. The connecting bracket forms a plate, wherein one end of the plate has a shoulder with an elastic spring or tenon and wherein the free tip of the elastic spring or tenon is directed toward the molding, and wherein the second end of the plate is terminated with the spacer flange in contrast. The inclined position of the key slot increases the rip off strength of the wall associated with the molding slot, the flanges of the connecting bracket alleviate substantially the assembly of the connecting bracket, since the flanges allow support on the floor during designation of the hole position. The spring or tenon faces of the connecting bracket are furnished with the hooks disposed in a triangular profile. This secures the molding against an easy sliding out. The connecting bracket exhibits at least one shelf, which fixedly supports the electrical lines. The free end of the shelf is advantageously bent in the direction of the wall. It is advantageous where the faces of the slot exhibit longitudinal grooves, wherein the longitudinal grooves together with the hooks or projections of the springs or tenons of the connecting bracket guarantee the proper attachment of the molding.

The spacer flange is terminated with a spacer element from the oblique abutting surface. This spacer element in connection with the molding with a chamfered end provides a longer contact surface of the flanges with the floor. This is of particular importance in the case of large floor areas as the expansion gap is to be made relatively large in such cases. The free end of the tenon of the connecting bracket is so shaped that the free end flexibly rests against the inner surface of the tenon after the molding is fastened.

The molding on its inner part has an extended wall, which extended wall forms an outline of an inverted V shape with the oblique chamfered end, and wherein the extended wall is furnished with a kind of catch hook seated on the spacer element of the connecting bracket.

The skirting board has inside corner elements, outside corner elements and overlapping elements covering adjoining lateral surfaces of two skirting boards which elements comprise a cover shaped like the molding and ribs with the oblique slot and with a catch hook in the lower part of the ribs, wherein the catch hook serves for fastening to the connecting bracket. The surfaces of the slot of those elements have corrugations which corrugations cooperate, after assembly, with hooks or projections of the tenon of the connecting bracket. The terminating finishing elements of the skirting board have cylindrical elements, preferably in the form of a sleeve, and abutting elements, preferably in a form similar to a parallelepiped, to be fastened to the ends of the skirting board.

A variant of the molding has the form of a covering, preferably from poly vinyl chloride, which covering forms a skeleton profile divided with ribs into chambers. The molding has a longitudinal protrusion disposed parallel to the wall surface, forming with the chamfered end of the molding an inverted V shape and the protrusion cooperates with the beaded edge of the spacer flange of the connecting bracket. The upper chamber of the molding has an edge protruding towards the wall beyond the basic profile of the skirting board.

The outer profile of the molding widens towards the bottom while the width of the chambers remains the same and the shelf ledges of the connecting bracket are accordingly wider in the enlarged wall space. This allows for covering a wider expansion gap and for placing a greater number of power supply cables.

The subject of the invention is shown by way of example in the drawings, wherein.

Figure 1:
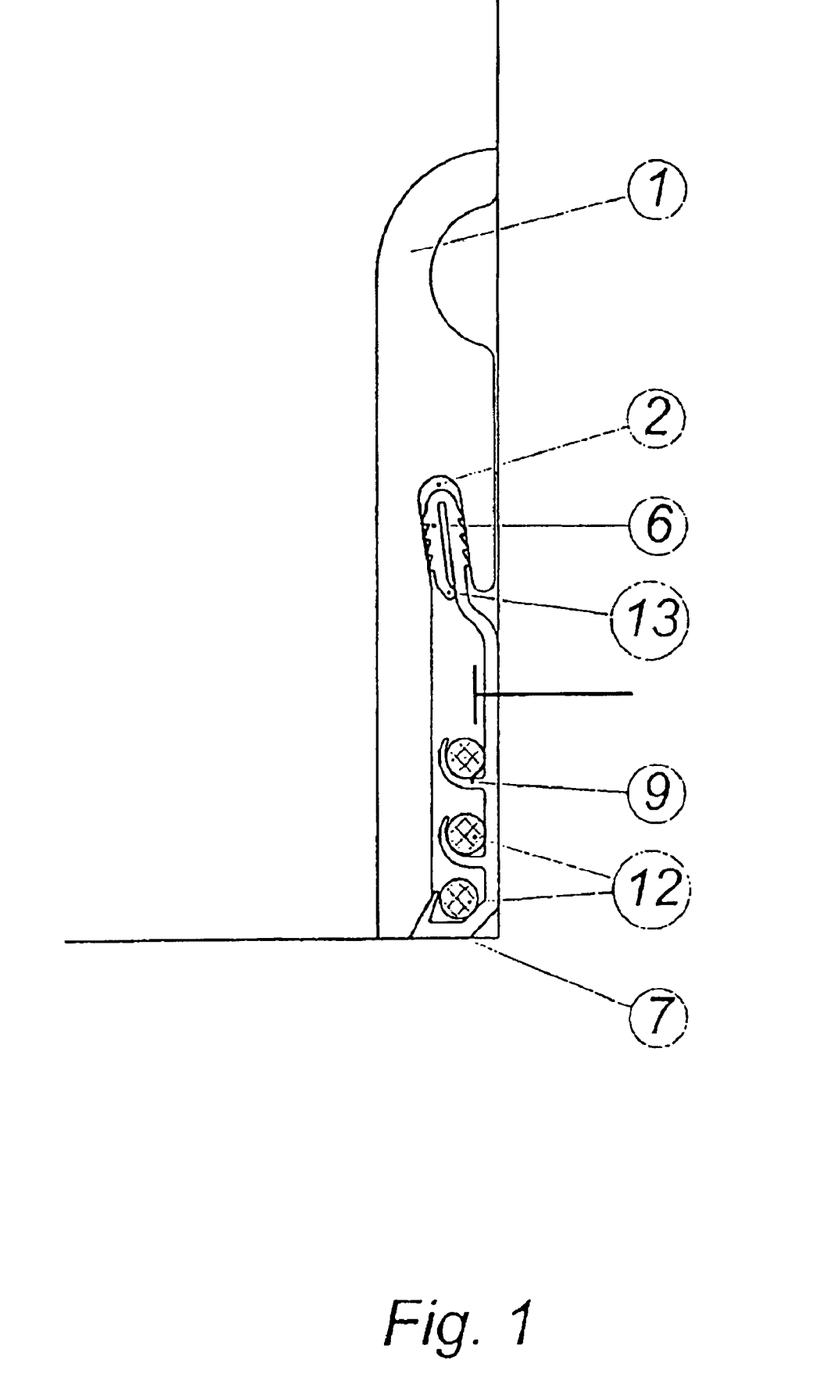
FIG. 1 shows a cross sectional view of the skirting board fastened to the wall, FIG. 2—a front view of a MDF molding, FIG. 3—a perspective view of the connecting bracket, FIG. 4—a front view of a poly vinyl chloride molding seated on the connecting bracket, FIG. 5—a front view of a poly vinyl chloride molding.
Figure 2:
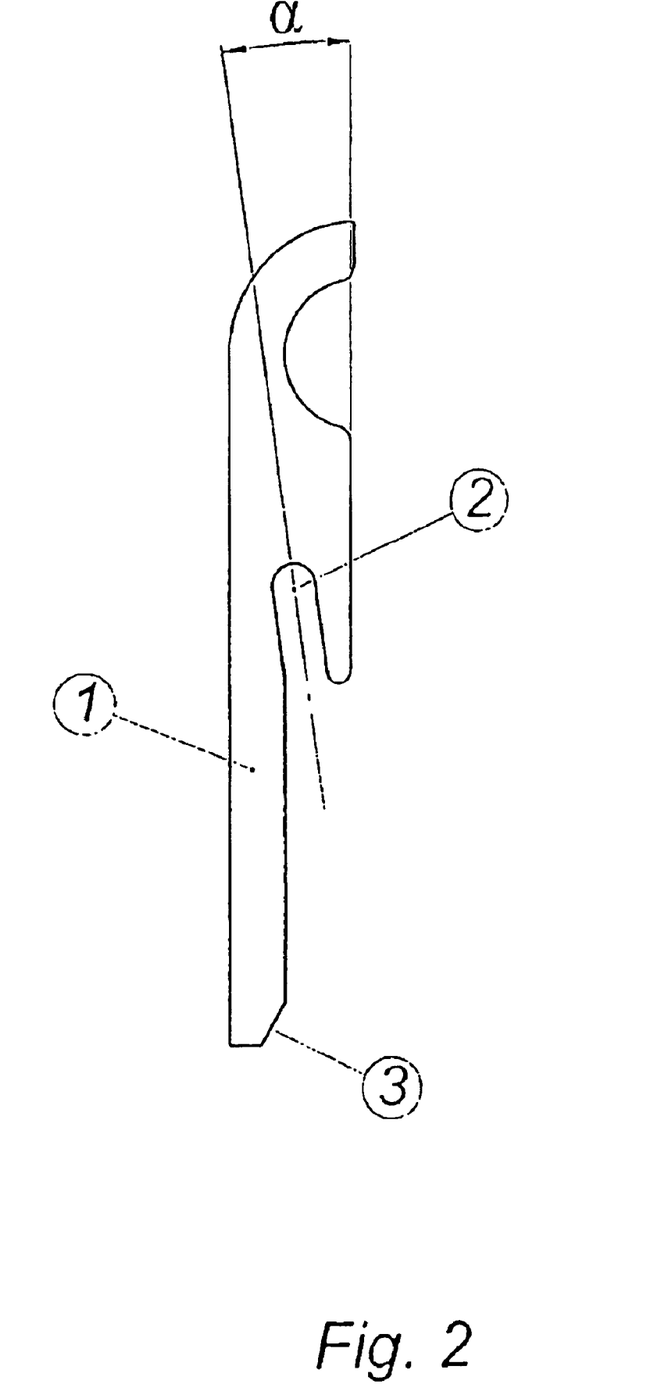
Figure 3:
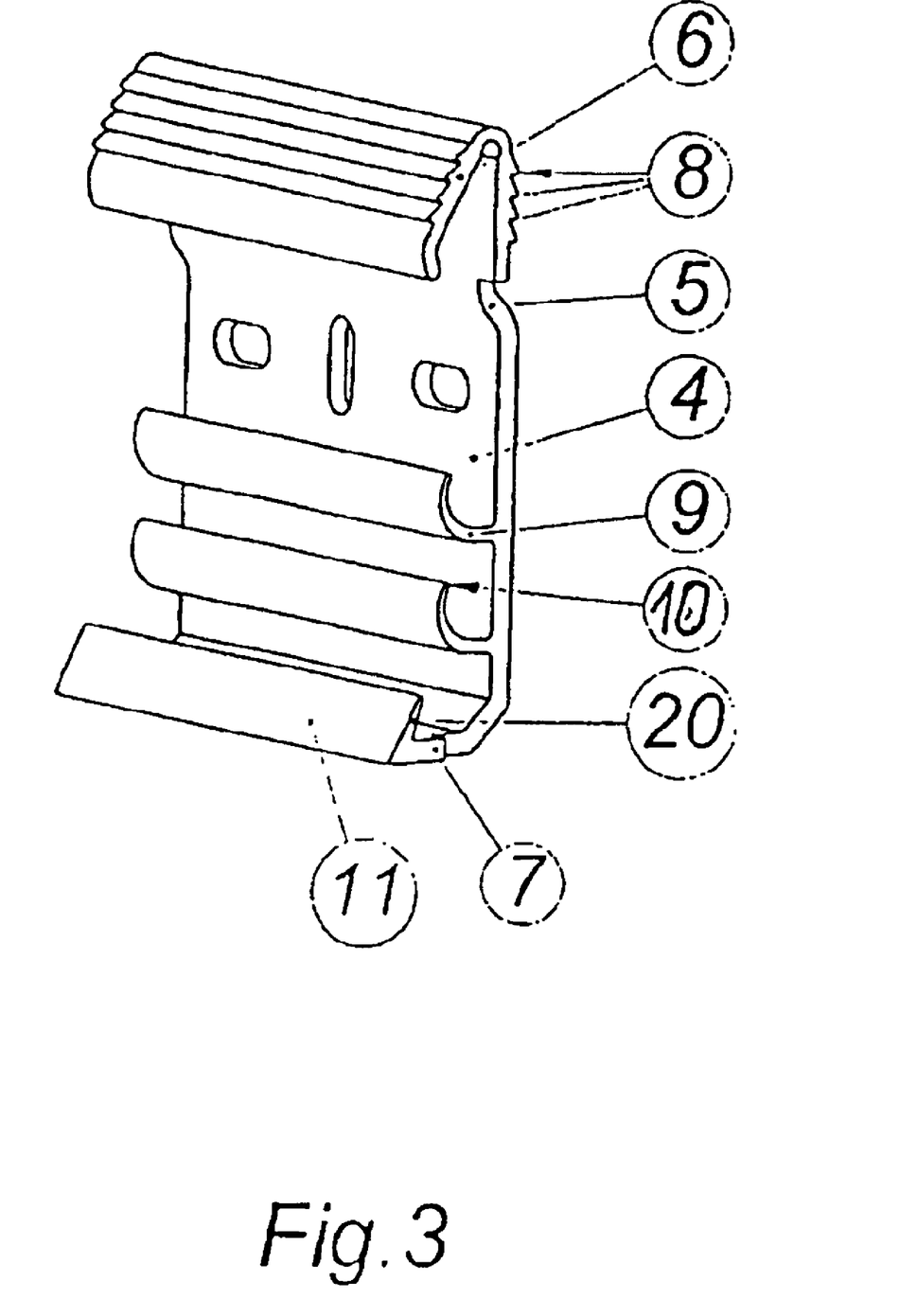
Figure 4:
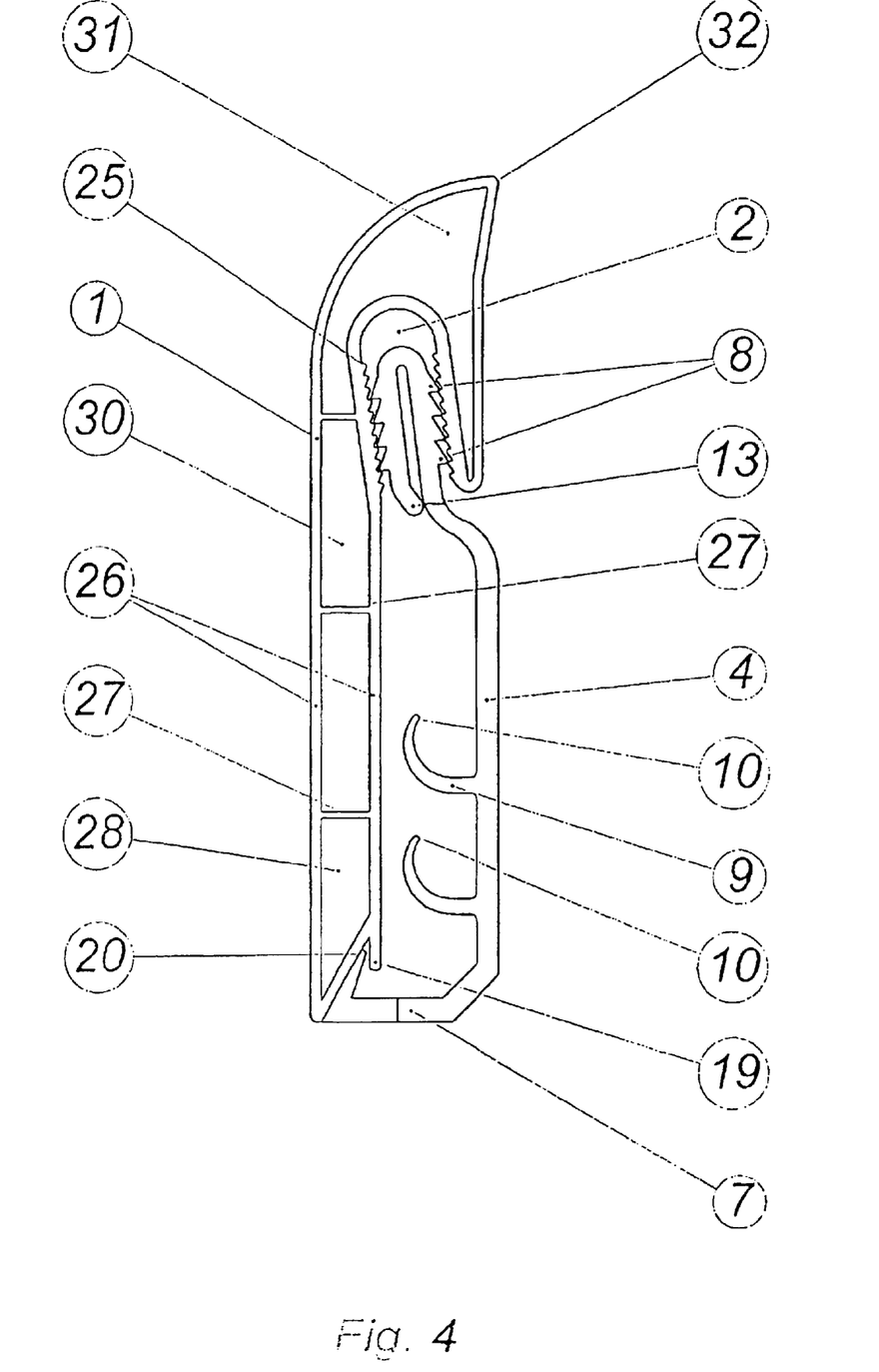
Figure 5:
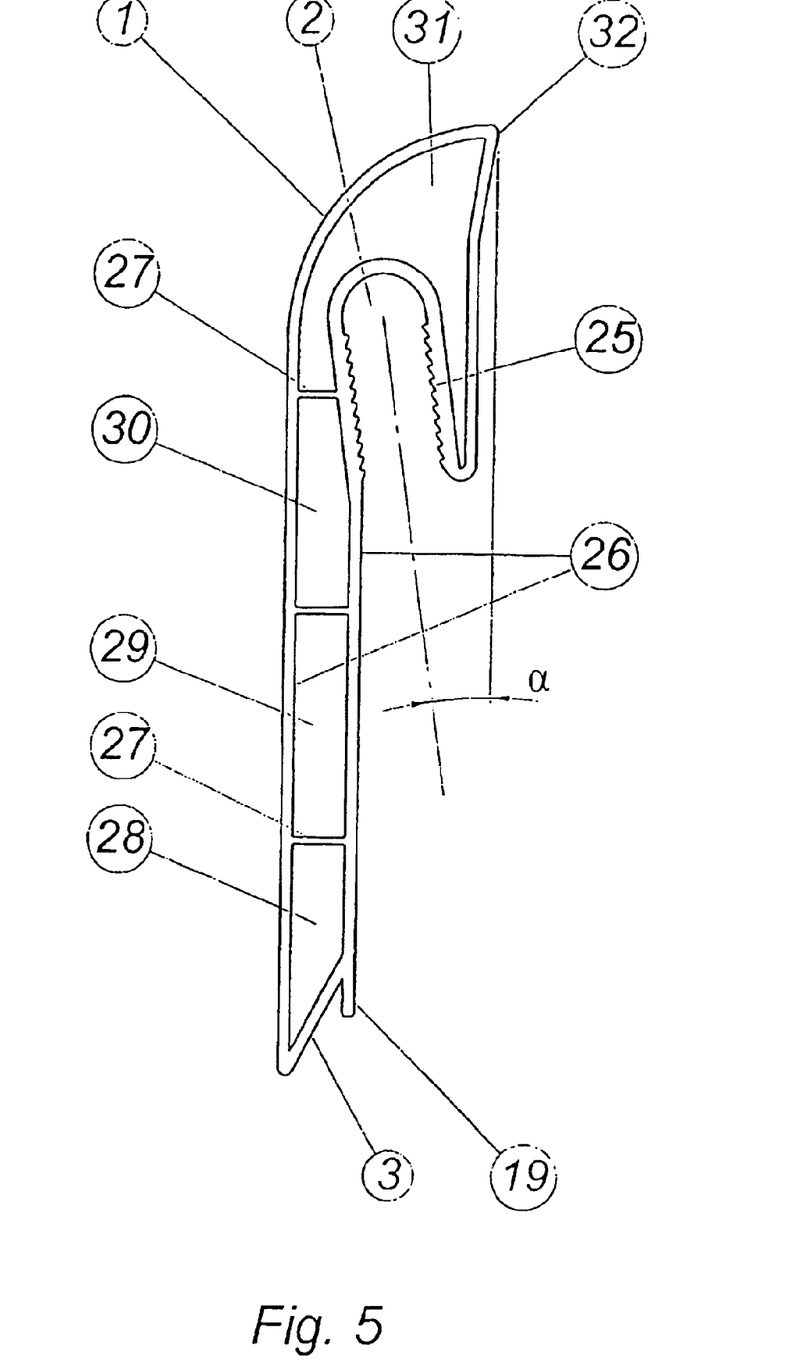

The molding 1 has a key slot 2 inclined at an acute angle alpha to the abutting surface of the wall and in its lower part the molding has a chamfered end 3. The connecting bracket 4 is a plate with a shoulder 5 terminated with a flexible tenon 6 with the free end tip of the flexible tenon 6 pointed towards the molding 1. The other end of the connecting bracket 4 is terminated with the spacer flange 7, which spacer flange 7 rests on the floor surface during installation of the molding. The flange considerably facilitates assembly of connecting brackets at the same height above the floor. The flange is terminated with the spacer element 20 with an oblique abutting surface 11, which abutting surface 11 cooperates with the chamfered end 3 of the molding 1. The chamfered end 3 enables an extension of the spacer flange, which is especially of importance for proper assembly, in particular in rooms with a large floor area, where it is necessary to provide an adequately wide expansion gap. The surfaces of the flexible tenon of the connecting bracket 4 have longitudinal hooks or projections 8 with a triangular profile which are a protection against the molding sliding off too easily. The connecting bracket has shelf ledges 9 terminated with a free end tip 10 bent towards the wall. The shelf ledges facilitate placing power supply cables 12 in the recess space behind the molding. The free end 13 of the elastic tenon 6 is so shaped that after the molding is fastened, the free end 13 flexibly rests against the inner surface of the elastic tenon. The connecting strip bracket has two openings allowing for fastening the connecting bracket to the wall, wherein it is sufficient to fasten the connecting bracket with one plastic screw anchor. The other opening is used for changing location of the connecting bracket in the event that after the molding has been taken off the connecting brackets many times, the slot of the molding has become too worn. Especially, this occurs when the molding is made from MDF board.

Figure 8:
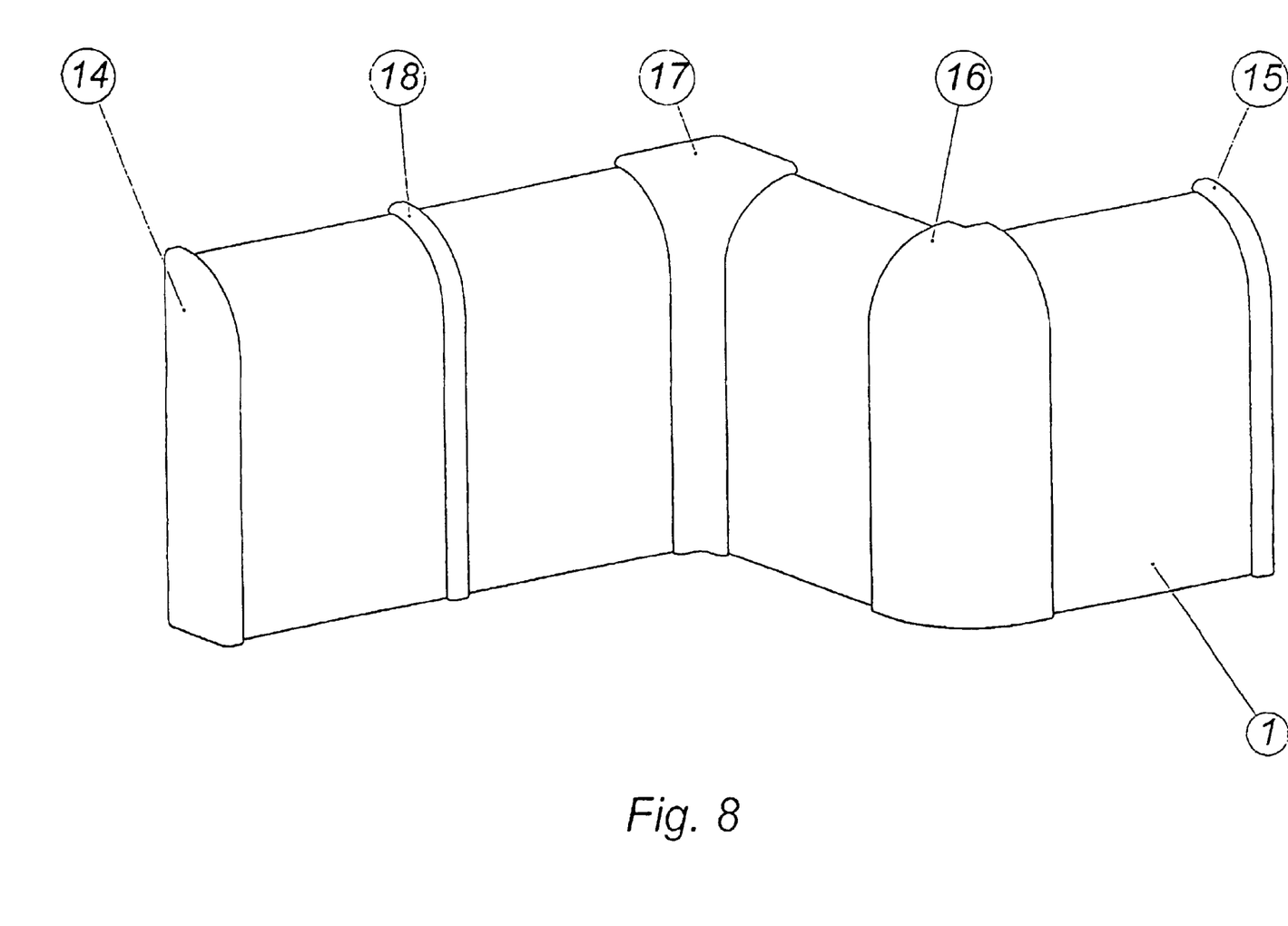
Figure 9:
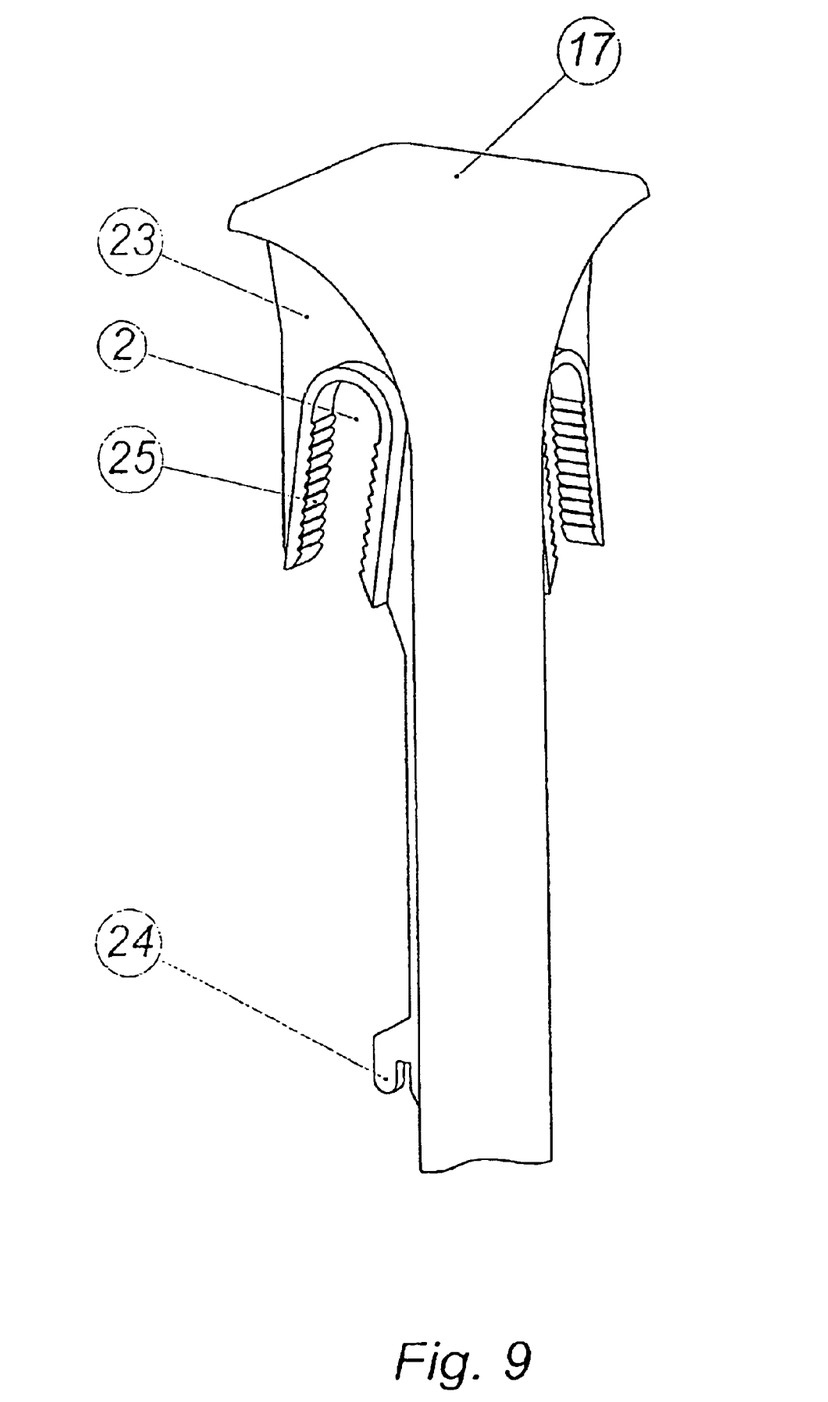
Figure 10:
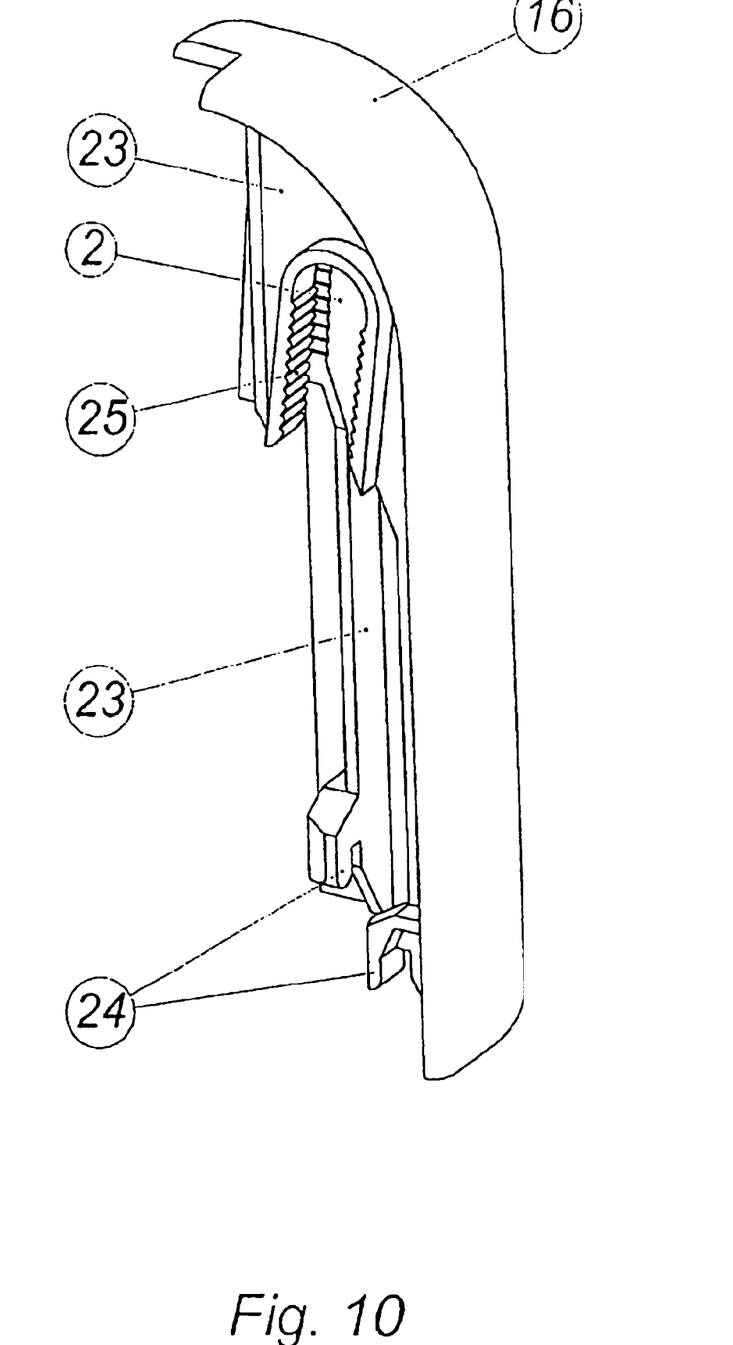
Figure 11:
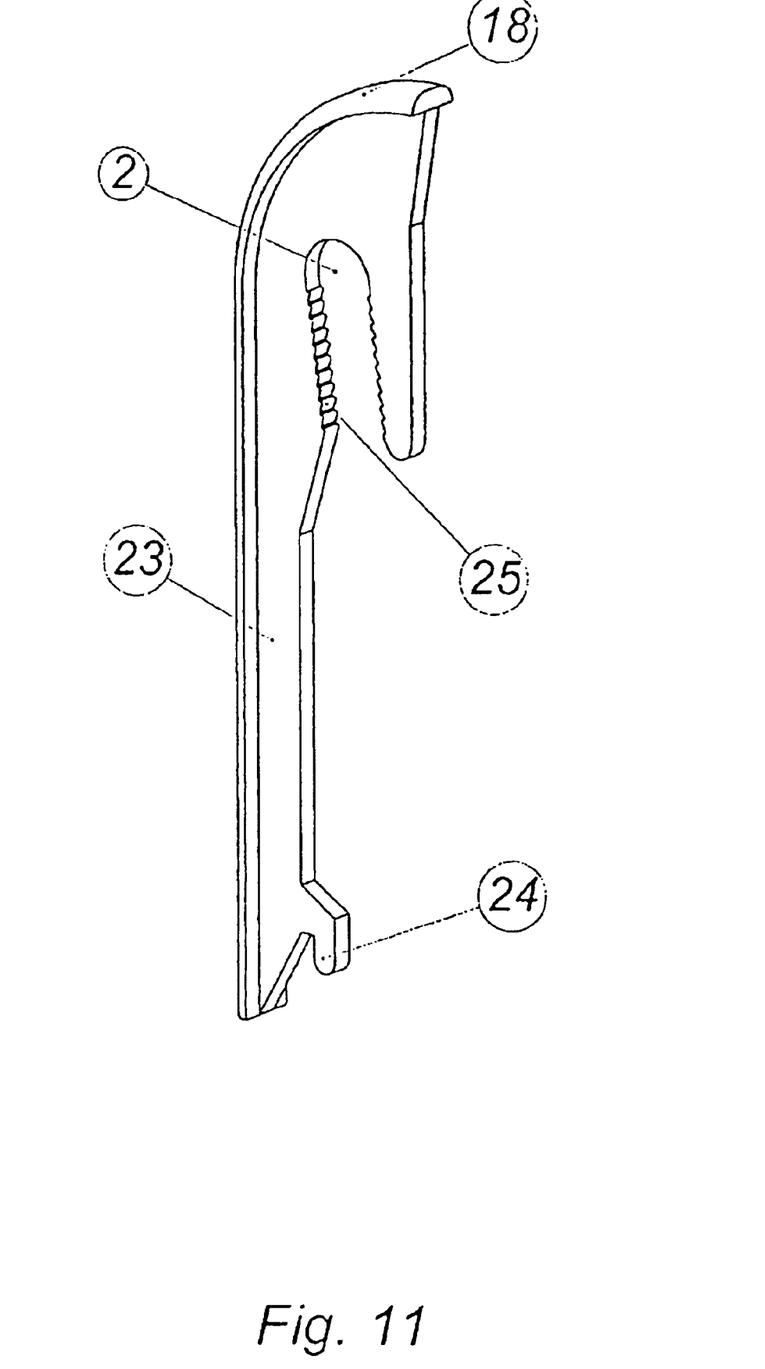
Figure 12:
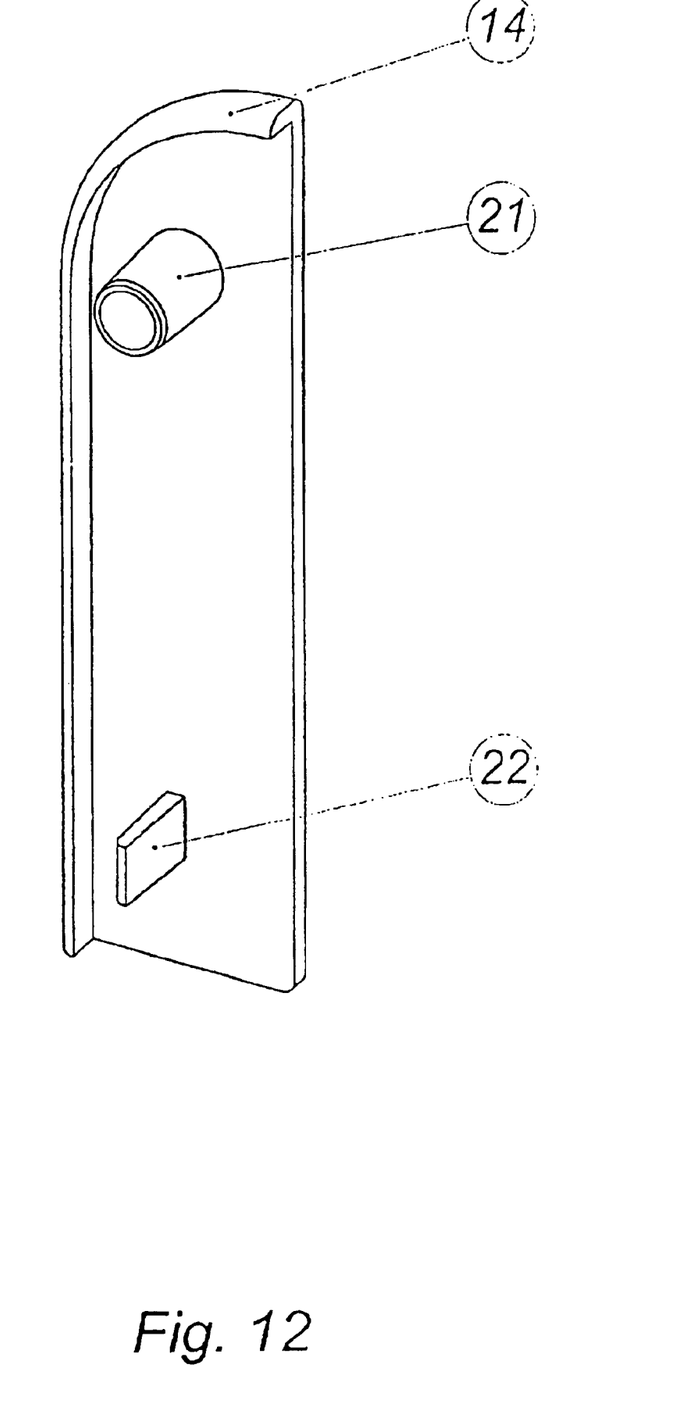
Figure 13:
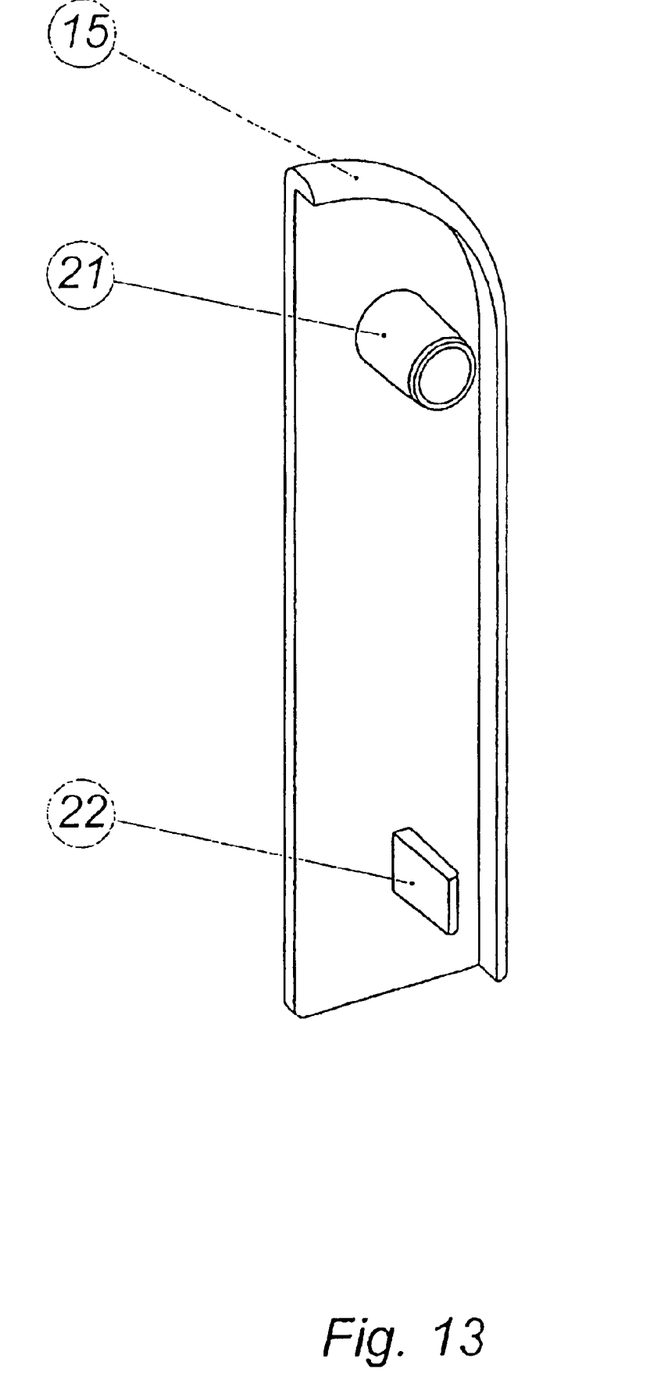

The skirting board 1 is equipped with finishing elements 14, 15, outside corner element 16, inside corner element 17 and overlapping elements covering adjoining lateral surfaces of two skirting boards 18. The molding 1 is seated on the connecting bracket 4 fastened to the wall in a known manner by means of plastic screw anchors.

Figure 6:
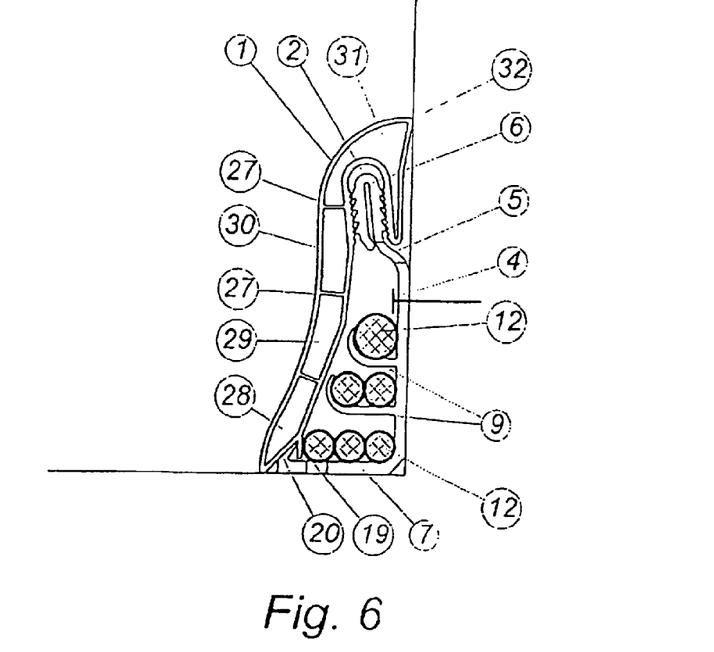
FIG. 6—a cross sectional view of a variant of a poly vinyl chloride molding fastened to the wall, FIG. 7—a front elevational view of the poly vinyl chloride molding shown in the FIG. 6, FIG. 8—a view of the skirting board with finishing elements fastened thereto, FIG. 9—a perspective view of the inside corner element, FIG. 10—a perspective view of the outside corner element, FIG. 11—a perspective view of the overlapping element covering adjoining lateral surfaces of two skirting boards, FIG. 12—the left finishing cap, and FIG. 13—the right finishing cap.
Figure 7:
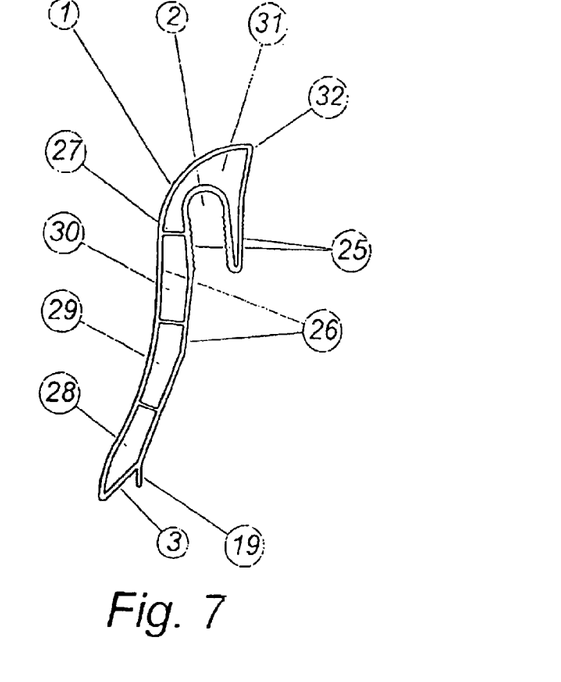

A variant of the molding made from poly vinyl chloride has the form of a covering whose inner wall extends beyond the chamfered abutting end 3, forming an outline of an inverted V shape therewith, and forms a kind of a catch 19 seated on the spacer element 20 of the connecting bracket 4. The finishing elements 14, 15 of the skirting board have cylindrical elements 21, preferably in the form of a sleeve, and abutting elements 22, preferably in the form similar to a parallel epiped, to be fastened to the ends of the skirting board. The finishing elements are a mirror reflection of each other. The inside corner elements 17, outside corner elements 16 and overlapping elements covering adjoining lateral surfaces of two skirting boards 18 consist of a cover shaped like the molding and ribs 23 with an oblique key slot 2 and a catch 24 in its lower part to be fastened to the connecting bracket 4. The surfaces of the slot of those elements have corrugations 25 which cooperate, after assembly, with hooks 8 of the tenon of the connecting bracket 4. The molding in the form of a closed covering 26, preferably from poly vinyl chloride (FIG. 4, FIG. 5, FIG. 6, FIG. 7), has a skeleton profile divided with ribs into chambers 28, 29, 30, 31. The upper chamber 31 has an edge 32 protruding the wall beyond the basic profile of the skirting board. Such a shape of the upper chamber makes the molding to abut tightly and with line contact against the wall even if the wall is uneven. Because the outer profile of the molding widens towards the bottom (FIG. 6, FIG. 7) while the width of the chambers 28, 29 remains the same, it is possible to mount a connecting bracket 4 with an accordingly wider spacer flange 7 and shelf ledges 9 and place a greater number of power supply cables 12 into the enlarged wall space.

The invention claimed is:

1. A skirting board with finishing elements, comprising
   a molding with a slot having an opening in a downward direction, which slot detachably cooperates with an upwardly directed flexible tenon (6) of a connecting bracket such that the slot (2) is moveable downwardly onto and over the flexible tenon and moveable upwardly from and releasing the flexible tenon (6), wherein the molding (1) is furnished with the slot (2) inclined at an acute angle (alpha) to a wall and wherein in contrast the connecting bracket (4) forms a plate, wherein one end of the plate has an oblique flexible shoulder (5) terminated with the flexible tenon (6), wherein a free end tip of the flexible tenon (6) is pointed towards the molding and wherein another end (4) of the plate is terminated by a spacer flange (7), and
   wherein a free end (13) of the tenon of the connecting bracket is so profiled that the free end (13) rests against an inner part of the flexible tenon (6) after the molding is fastened.

2. A skirting board with finishing elements, comprising
   a molding with a slot having an opening in a downward direction, which slot detachably cooperates with an upwardly directed flexible tenon (6) of a connecting bracket such that the slot (2) is moveable downwardly onto and over the flexible tenon and moveable upwardly from and releasing the flexible tenon (6), wherein the molding (1) is furnished with the slot (2) inclined at an acute angle (alpha) to a wall and wherein in contrast the connecting bracket (4) forms a plate, wherein one end of the plate has an oblique flexible shoulder (5) terminated with the flexible tenon (6), wherein a free end tip of the flexible tenon (6) is pointed towards the molding and wherein another end (4) of the plate is terminated by a spacer flange (7), and
   further comprising inside corner elements (17), outside corner elements (16) and overlapping elements (18) covering adjoining lateral surfaces of two skirting boards, wherein the inside corner elements (17), outside corner elements (16) and overlapping elements (18) comprise a cover, shaped like the moldings and ribs (23) with an oblique slot (2) and a catch (24) in their lower part to be fastened to the connecting bracket (4), wherein surfaces of the slot of those elements have corrugations (25) which cooperate, after assembly, with hooks (8) of the tenon of the connecting bracket (4).

3. A skirting board with finishing elements, comprising
   a molding with a slot having an opening in a downward direction, which slot detachably cooperates with an upwardly directed flexible tenon (6) of a connecting bracket such that the slot (2) is moveable downwardly onto and over the flexible tenon and moveable upwardly from and releasing the flexible tenon (6), wherein the molding (1) is furnished with the slot (2) inclined at an acute angle (alpha) to a wall and wherein in contrast the connecting bracket (4) forms a plate, wherein one end of the plate has an oblique flexible shoulder (5) terminated with the flexible tenon (6), wherein a free end tip of the flexible tenon (6) is pointed towards the molding and wherein another end (4) of the plate is terminated by a spacer flange (7), and
   wherein the molding has a form of a closed covering made of polyvinyl chloride, which forms a skeleton profile subdivided into chambers (28, 29, 30, 31) by way of ribs (27) and wherein the molding has a longitudinal protrusion (19) disposed parallel to a surface of the wall, wherein the longitudinal protrusion (19) forms with a chamfered end (3) of the molding an inverted V shape and wherein the longitudinal protrusion (19) cooperates with a beaded edge (20) of the spacer flange (7) of the connecting bracket (4).

4. The skirting board according to claim 3, wherein faces of the tenon (6) are furnished with catch hooks (8) having a profile of a triangle, and wherein the slot (2) is furnished with parallel disposed inner walls.

5. The skirting board according to claim 3, wherein the connecting bracket (4) has at least one shelf ledge (9) for supporting power supply cables (12), and wherein a free end (10) of the shelf ledge is bent towards the wall, and wherein the slot (2) is furnished with parallel disposed inner walls.

6. The skirting board according to claim 3, wherein faces of the slot (2) are furnished with longitudinal corrugations (25).

7. The skirting board according to claim 3, wherein the spacer flange (7) is terminated with the beaded edge (20) having an oblique abutting surface (11), and wherein the chamfered end of the molding is for resting against the oblique abutting surface (11).

8. The skirting board according to claim 3, wherein the longitudinal protrusion (19) of the molding is on an inner side, and wherein the longitudinal protrusion is a kind of a catch hook for engaging the beaded edge (20) of the connecting bracket (4).

9. The skirting board according to claim 3, wherein an upper chamber (31) of the molding has an edge (32) that is disposed outside of a basic profile of the skirting board and is protruding towards the wall.

10. The skirting board according to claim 9 wherein an outer profile of the molding (1) widens towards a bottom and wherein a width of the chambers (28, 29) of the molding remains the same, and wherein shelf ledges (9) of the connecting bracket are accordingly relatively wide in an enlarged recess space.

11. A skirting board with finishing elements, comprising
a flexible tenon (6) forming part of a connecting bracket (4),
a plate forming part of the connecting bracket (4);
a spacer flange (7) forming part of the connecting bracket (4);
a slot (2) forming part of a molding (1), wherein the slot (2) detachably cooperates with the flexible tenon (6) of the connecting bracket by moving downwardly over the flexible tenon (6) or by moving upwardly for releasing the flexible tenon (6), wherein the slot (2) is inclined at an acute angle (alpha) relative to a wall and wherein one end of the plate has an oblique flexible shoulder (5) terminated with the flexible tenon (6), wherein a free end tip of the flexible tenon (6) is pointed towards the molding and wherein another end of the plate is terminated by the spacer flange (7);
wherein a free end (13) of the tenon of the connecting bracket is so profiled that the free end (13) rests against an inner part of the flexible tenon (6) after the molding is fastened.

12. The skirting board according to claim 11, wherein faces of the tenon (6) are furnished with catch hooks (8) having a profile of a triangle.

13. The skirting board according to claim 11 further comprising,
a shelf ledge (9) forming part of the connecting bracket (4) for supporting power supply cables (12), and wherein a free end (10) of the shelf ledge is bent towards the wall, and wherein the slot (2) is furnished with parallel disposed inner walls.

14. The skirting board according to claim 11, further comprising
longitudinal corrugations forming part of the molding;
wherein faces of the slot (2) are furnished with the longitudinal corrugations (25).

15. The skirting board according to claim 11 further comprising
a spacer element (20) forming part of the connecting bracket (4);
wherein the spacer flange (7) is terminated with the spacer element (20) with an oblique abutting surface (11), and wherein the molding (1) has a chamfered end for resting against the oblique abutting surface (11).

16. The skirting board according to claim 11, further comprising
a longitudinal protrusion (19) forming part of the molding (1);
a spacer element (20) forming part of the connecting bracket (4);
wherein the molding (1) has the longitudinal protrusion (19) on an inner side, wherein the longitudinal protrusion (19) forms, together with an oblique chamfered end (3) an outline of an inverted V shape, wherein the longitudinal protrusion (19) is a kind of a catch hook for engaging the spacer element (20) of the connecting bracket (4).

17. The skirting board according to claim 11,
wherein an outer profile of the molding (1) widens towards a bottom,
wherein the molding (1) has a skeleton profile divided into chambers (28, 29), and wherein a width of the chambers (28, 29) remains the same, and wherein shelf ledges (9) of the connecting bracket are accordingly relatively wide in an enlarged recess space.

18. The skirting board according to claim 17 further comprising
an upper chamber (31) forming part of the molding, wherein the upper chamber (31) has an edge (32) protruding towards the wall and disposed outside of the connecting bracket (4).

19. The skirting board according to claim 17, wherein the molding (1) has the slot (2) disposed obliquely relative to the wall surface and wherein the slot (2) is open towards a bottom side.

20. The skirting board according to claim 11, the flexible tenon (6), wherein the slot (2) is inclined at an acute angle (alpha) relative to a wall and wherein one end of the plate has an oblique flexible shoulder (5) terminated with the flexible tenon (6), wherein a free end tip of the flexible tenon (6) is pointed towards the molding and wherein another end of the plate is terminated by the spacer flange (7);
wherein catches disposed on the molding (1) and on the bracket (4) allow adjustment of a position of the molding (1) and insure holding the molding (1) on the surface of the floor by making up for irregularities of the floor;
and wherein the molding has a form of a closed covering, which forms a skeleton profile subdivided into chambers (28, 29, 30, 31) by way of ribs (27).

21. The skirting board according to claim 11 wherein the molding (1) is placed on the connecting bracket (4) fixed to a wall with a downward sliding movement perpendicular to a floor.

22. The skirting board according to claim 11, further comprising
ribs dividing a skeleton profile into chambers (28, 29, 30, 31), wherein one of the chambers (28, 29, 30, 31) forms an upper chamber (31);
an edge (32) disposed at the upper chamber (31) and protruding towards the wall beyond a basic profile of the skirting board, wherein such a shape of the upper chamber (31) makes the molding (1) to abut tightly and with line contact against the wall even if the wall is uneven.

23. A skirting board with finishing elements, comprising
a flexible tenon (6) forming part of a connecting bracket (4),
a plate forming part of the connecting bracket (4);
a spacer flange (7) forming part of the connecting bracket (4);
a slot (2) forming part of a molding (1), wherein the slot (2) detachably cooperates with the flexible tenon (6) of the connecting bracket by moving downwardly over the flexible tenon (6) or by moving upwardly for releasing the flexible tenon (6), wherein the slot (2) is inclined at an acute angle (alpha) relative to a wall and wherein one end of the plate has an oblique flexible shoulder (5) terminated with the flexible tenon (6), wherein a free end tip of the flexible tenon (6) is pointed towards the molding and wherein another end of the plate is terminated by the spacer flange (7);

inside corner elements (17), outside corner elements (16) and overlapping elements (18) covering adjoining lateral surfaces of two skirting boards, wherein the inside corner elements (17), outside corner elements (16) and overlapping elements (18) comprise a cover, shaped like the molding, and ribs (23) with an oblique slot (2) and a catch (24) in their lower part to be fastened to the connecting bracket (4), wherein surfaces of the slot of those elements have corrugations (25) which cooperate, after assembly, with hooks (8) of the tenon of the connecting bracket (4).

24. A skirting board with finishing elements, comprising
a flexible tenon (6) forming part of a connecting bracket (4),
a plate forming part of the connecting bracket (4);
a spacer flange (7) forming part of the connecting bracket (4);
a slot (2) forming part of a molding (1), wherein the slot (2) detachably cooperates with the flexible tenon (6) of the connecting bracket by moving downwardly over the flexible tenon (6) or by moving upwardly for releasing the flexible tenon (6), wherein the slot (2) is inclined at an acute angle (alpha) relative to a wall and wherein one end of the plate has an oblique flexible shoulder (5) terminated with the flexible tenon (6), wherein a free end tip of the flexible tenon (6) is pointed towards the molding and wherein another end of the plate is terminated by the spacer flange (7);
wherein the molding has a form of a closed covering made of poly vinyl chloride, which forms a skeleton profile subdivided into chambers (28, 29, 30, 31) by way of ribs (27) and wherein the molding has a longitudinal protrusion (19) disposed parallel to a surface of the wall, wherein the longitudinal protrusion (19) forms with a chamfered end (3) of the molding an inverted V shape and wherein the longitudinal protrusion (19) cooperates with a beaded edge (20) of the spacer flange (7) of the connecting bracket (4).

25. A skirting board with finishing elements, comprising
a flexible tenon (6) forming part of a connecting bracket (4),
a plate forming part of the connecting bracket (4);
a spacer flange (7) forming part of the connecting bracket (4);
a slot (2) forming part of a molding (1), wherein the slot (2) detachably cooperates with the flexible tenon (6) of the connecting bracket by moving downwardly over the flexible tenon (6) or by moving upwardly for releasing the flexible tenon (6), wherein the slot (2) is inclined at an acute angle (alpha) relative to a wall and wherein one end of the plate has an oblique flexible shoulder (5) terminated with the flexible tenon (6), wherein a free end tip of the flexible tenon (6) is pointed towards the molding and wherein another end of the plate is terminated by the spacer flange (7);
wherein the tenon (6) cooperating with the slot (2) is shaped like an inverted letter V.

26. A skirting board with finishing elements, comprising
a flexible tenon (6) forming part of a connecting bracket (4),
a plate forming part of the connecting bracket (4);
a spacer flange (7) forming part of the connecting bracket (4);
a slot (2) forming part of a molding (1), wherein the slot (2) detachably cooperates with the flexible tenon (6) of the connecting bracket by moving downwardly over the flexible tenon (6) or by moving upwardly for releasing the flexible tenon (6),
wherein the slot (2) is inclined at an acute angle (alpha) relative to a wall and wherein one end of the plate has an oblique flexible shoulder (5) terminated with the flexible tenon (6), wherein a free end tip of the flexible tenon (6) is pointed towards the molding and wherein another end of the plate is terminated by the spacer flange (7);
wherein an engagement of the molding (1) with respect to the tenon (6) is determined by the shape of the tenon (6) in a free state of the tenon (6) and wherein the free state of the tenon (6) is shaped like an inverted "V" and wherein upon a placing of the molding (1) upon the connecting bracket (4), walls of the tenon (6), when located in the slot (2), are moved parallel to each other.

27. A skirting board with finishing elements, comprising a molding with a slot having an opening in a downward direction, wherein the slot is disposed in said molding, which slot detachably cooperates with an upwardly directed flexible tenon (6) of a connecting bracket, wherein the flexible tenon is disposed in an upper half of said connecting bracket, such that the slot (2) is moveable downwardly onto and over the flexible tenon and moveable upwardly from and releasing the flexible tenon (6), wherein the molding (1) is furnished with the slot (2) inclined at an acute angle (alpha) to a wall and wherein in contrast the connecting bracket (4) forms a plate attachable to the wall, wherein one end of the plate has an oblique flexible shoulder (5) terminated with the flexible tenon (6), wherein the plate is disposed at a distance from the molding (1) thereby defining a space volume between the connecting bracket (4) and the molding (1) and reaching up to the oblique flexible shoulder (5), wherein a free end tip of the flexible tenon (6) is pointed towards the molding,
wherein a free end (13) of the tenon of the connecting bracket is so folded back that the free end (13) rests against an inner part of the flexible tenon (6) after the molding is fastened, and
wherein another end (4) of the plate is terminated by a spacer flange (7).

28. A skirting board with finishing elements, comprising
a flexible tenon (6) forming part of a connecting bracket (4), wherein the flexible tenon (6) is disposed in an upper half of the connecting bracket;
a plate forming part of the connecting bracket (4);
a spacer flange (7) forming part of the connecting bracket (4);
a slot (2) forming part of a molding (1) and disposed in the molding (1), wherein the slot (2) detachably cooperates with the flexible tenon (6) of the connecting bracket by moving downwardly over the flexible tenon (6) or by moving upwardly for releasing the flexible tenon (6), wherein the slot (2) is inclined at an acute angle (alpha) relative to a wall, wherein the connecting bracket is attachable to the wall, and wherein one end of the plate has an oblique flexible shoulder (5) terminated with the flexible tenon (6), wherein the plate is disposed at a distance from the molding (1) thereby defining a space volume between the molding and the connecting bracket and reaching up to the oblique flexible shoulder (5), wherein a free end tip of the flexible tenon (6) is pointed towards the molding and wherein another end of the plate is terminated by the spacer flange (7) and wherein the molding has a longitudinal protrusion (19) disposed parallel to a surface of the wall, wherein the longitudinal protrusion (19) forms with a chamfered end (3) of the molding an inverted V shape and wherein the longitudinal protrusion (19) cooperates with a beaded edge (20) of the spacer flange (7) of the connecting bracket (4).

* * * * *